No. 738,442. PATENTED SEPT. 8, 1903.
W. C. HEITKAMP.
BOILER ALARM.
APPLICATION FILED JUNE 23, 1902.
NO MODEL. 2 SHEETS—SHEET 1.

Witnesses
M. Blondel
Clarence Shaw

Inventor
W. C. Heitkamp.
By Oscar W. Brock
Attorneys

THE NORRIS PETERS CO., PHOTO-LITHO., WASHINGTON, D. C.

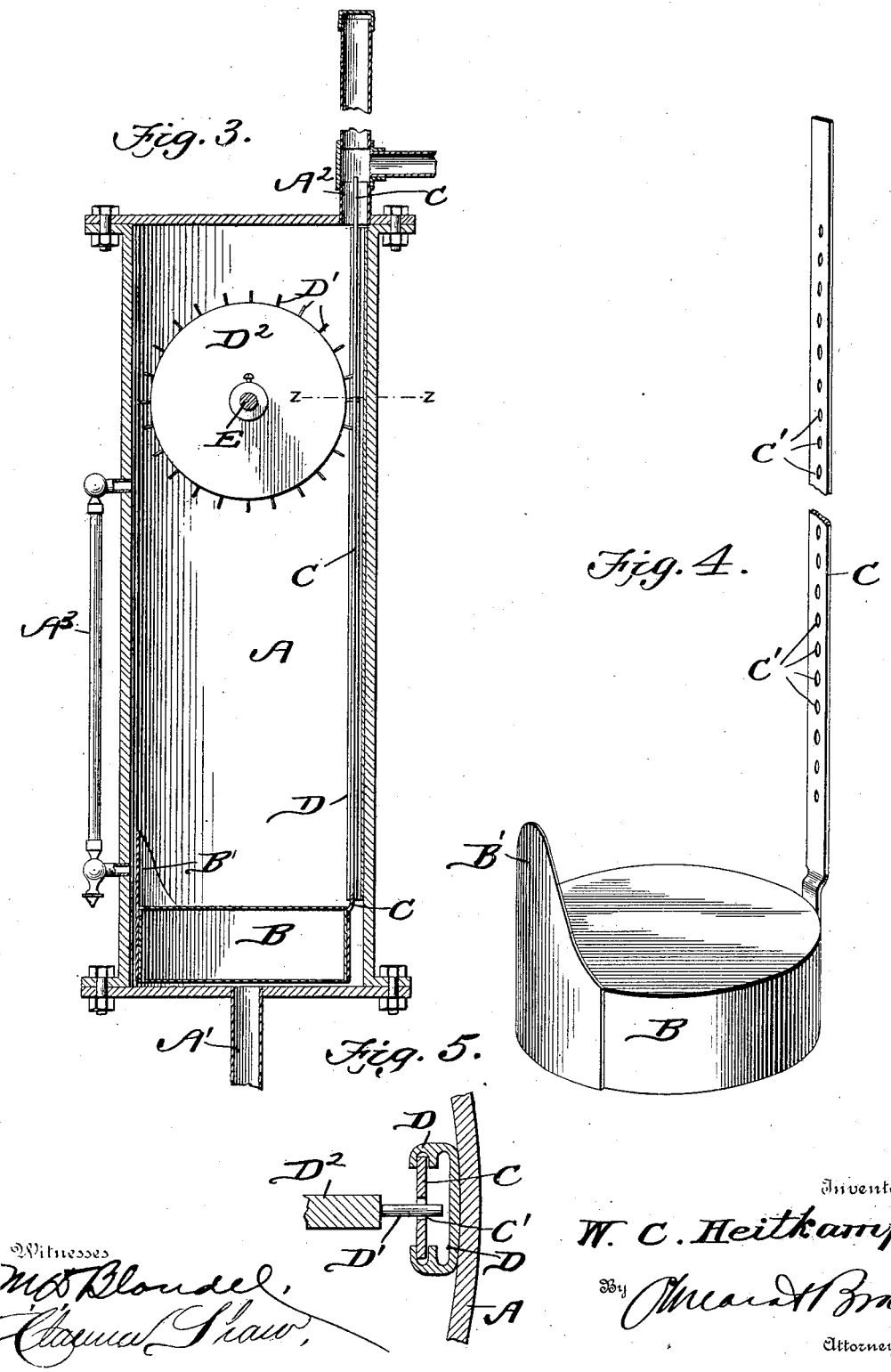

No. 738,442. Patented September 8, 1903.

UNITED STATES PATENT OFFICE.

WILLIAM C. HEITKAMP, OF PLEASANTRIDGE, OHIO.

BOILER-ALARM.

SPECIFICATION forming part of Letters Patent No. 738,442, dated September 8, 1903.

Application filed June 23, 1902. Serial No. 112,921. (No model.)

*To all whom it may concern:*

Be it known that I, WILLIAM C. HEITKAMP, a citizen of the United States, residing at Pleasantridge, in the county of Hamilton and State of Ohio, have invented a new and useful Boiler-Alarm, of which the following is a specification.

This invention is an improved construction of boiler-alarm, the object being to provide a simple and efficient device by means of which signals can be given whenever the water within the boiler is excessively high or excessively low, and also give a danger signal whenever the condition is such as to indicate danger and call for immediate relief.

With these objects in view the invention consists in providing a cylindrical body with a float, connecting said cylindrical body with the pipe leading to the boiler, providing said float with an arm capable of operating a wheel, which wheel rotates a shaft carrying a pointer or indicator and which also serves to close one or more electric circuits at different intervals, thereby sounding alarms for the purpose of indicating high water, low water, or danger.

The invention consists also in certain details of construction and novelties of combination hereinafter fully described, and pointed out in the claims.

Figure 1:
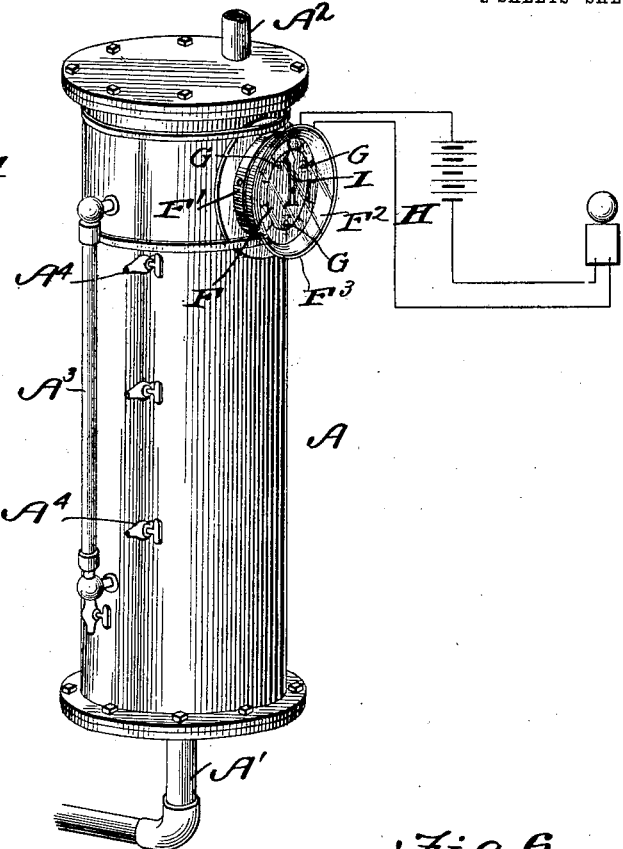
Figures 2, 6:
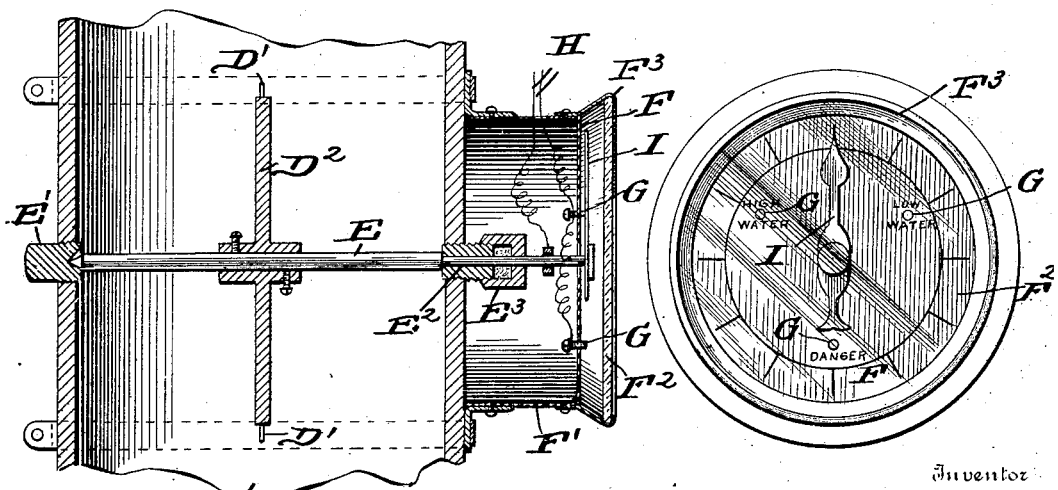

In the drawings forming part of this specification, Figure 1 is a perspective view of the apparatus constructed in accordance with my invention, the electrical connections being shown in diagram. Fig. 2 is a detail vertical section taken through the cylinder and indicating-dial. Fig. 3 is a vertical sectional view taken through the cylinder and float, the wheel operated by the said float being shown in elevation. Fig. 4 is a detail perspective view of the float and perforated arm connected therewith. Fig. 5 is a detail horizontal view taken on the line $z$ $z$ of Fig. 3, and Fig. 6 is a face view of the dial and indicator-hand.

In constructing a boiler-alarm in accordance with my invention I employ a cylinder A, which may be of any suitable size, said cylinder having a pipe A' connected to the lower end thereof, which pipe is connected with the water-space of the boiler. A steam-pipe $A^2$ leads from the upper end of the cylinder, and this pipe may be connected with the steam-space of the boiler. If desired, a gage-tube $A^3$ may be connected to the cylinder and also blow-off cocks $A^4$. A float B is arranged within the cylinder A and is of such size as to move freely up and down in the said cylinder, said float being moved up and down by the water rising or falling within the cylinder. An arm C is connected to the float B at one side, said arm traveling in a guide D, attached to the side of the cylinder. This arm C has a series of perforations C', said perforations being arranged for engagement with the studs or pins D', projecting radially from the wheel $D^2$, which is rigidly mounted upon the shaft E, one end of the shaft being journaled in a plug E', fitted into the side of the cylinder, the opposite end of the shaft being reduced, as shown at $E^2$, passing through a stuffing-box $E^3$. The reduced end $E^2$ also passes through a dial F, carried by a collar or band F', secured upon the exterior of the cylinder, said dial-plate F being protected by a glass $F^2$, held in place by metallic rim or bezel $F^3$. The dial-plate may be subdivided in any desirable manner, and at predetermined points I provide three contact-points G, and adjacent to one point I arrange the words "High water" and adjacent to another point the words "Low water," and the word "Danger" adjacent to the third point. The circuit-wires H connect the reduced end $E^2$ and the contact-points G, and if preferred separate bells may be employed to indicate "high water," "low water," and "danger;" but in practice I have found it desirable to use one bell. An indicator-hand and circuit-closer I is mounted upon the extreme end of the reduced portion $E^2$ of the shaft E, said indicator-hand just barely contacting with the contact-points G as it is moved around through the medium of the shaft E, wheel D, arm C, float B, it being understood that as the float rises the arm C will be raised, turning the wheel D, so as to move the indicator-hand toward high water, and when the float descends the reverse movement will of course be made, and whenever the float moves down adjacent to the bottom of the cylinder the indicator-hand will be moved around to the danger-point, thereby closing the circuit and sounding the alarm. It will of course be understood that the cylinder A is arranged at such a height with reference to the mean water-line of the boiler that the float in its movements between the bottom of the cylinder and the wheel D will be capable of producing the signals herein mentioned. In practice I prefer to arrange the steam-pipe $A^2$ in such a position that the upper end of the arm C will slide in the said pipe during the movements of the float, and I also prefer to construct said float with a guide-flange B', directly opposite the arm C, thereby insuring steady movement of the float and preventing any possible binding of the same.

Having thus fully described my invention, what I claim as new, and desire to secure by Letters Patent, is—

1. A device of the kind described comprising a cylinder, a cylindrical float in the cylinder, a guiding-flange arranged on one side of the float, a vertical guide-bracket secured within the cylinder opposite the flange, a vertical arm secured at its lower end to the float and adapted to slide in the guide-bracket, a revoluble shaft extending transversely through the cylinder, a wheel rigidly mounted thereon and adapted to be engaged and rotated by the rod, and means whereby the rotation of the wheel will sound an alarm.

2. The combination with a cylinder, having connection with the water and steam spaces of a boiler, of a float in the lower portion of the chamber, a vertical perforated rod connected to the float at one side, an upwardly-extending guiding-flange on the opposite side of the float, a guide secured within the cylinder adjacent the rod, a shaft revolubly mounted within the cylinder, a wheel adapted to engage the rod rigidly mounted thereon, and means whereby the rotation of the wheel will sound an alarm.

3. The combination with the cylinder having water and steam pipes connected thereto, of a guide arranged within the cylinder at one side thereof, a float arranged within the cylinder, a perforated arm connected to the float and adapted to travel in the guide, a shaft journaled in the cylinder, a wheel mounted thereon and provided with radial pins or studs, adapted to engage the perforated arm, the dial-plate having contact-points, the indicator-hand mounted upon the outer end of the shaft, and the electrical connections to the said shaft and contact-points carried by the dial, substantially as specified.

WILLIAM C. HEITKAMP.

Witnesses:
DAVID DAVIS,
VIEANNA LEFEBER.